United States Patent [19]
Hartranft et al.

[11] Patent Number: 5,457,136
[45] Date of Patent: Oct. 10, 1995

[54] THERMAL FOAM INSULATION

[75] Inventors: G. Robert Hartranft; Ronald S. Lenox, both of Lancaster; Dean L. Putt, Lititz; Joseph F. Remar, Lancaster, all of Pa.; Donald M. Snyder, Ypsilanti, Mich.

[73] Assignee: Armstrong World Industries, Inc., Lancaster, Pa.

[21] Appl. No.: 288,616

[22] Filed: Aug. 10, 1994

[51] Int. Cl.$^6$ .................................................. C08J 9/00
[52] U.S. Cl. ........................ 521/109.1; 106/122; 521/84.1
[58] Field of Search ................... 106/122; 521/84.1, 521/109.1

[56] References Cited

U.S. PATENT DOCUMENTS

| | | | |
|---|---|---|---|
| 3,598,157 | 8/1971 | Farr et al. ........................... | 138/157 |
| 3,814,808 | 6/1974 | Schwendeman et al. .............. | 424/360 |
| 4,086,331 | 4/1978 | Neumann ............................. | 424/45 |
| 4,331,547 | 5/1982 | Stotts et al. ......................... | 252/62 |
| 4,530,905 | 7/1985 | Freedman ............................ | 435/177 |
| 5,137,927 | 8/1992 | Wolff et al. ......................... | 521/54 |

Primary Examiner—Shelley A. Dodson

[57] ABSTRACT

Thermal insulation is prepared using gelatin foam. Embodiments of gelatin foam insulation which are described include gelatin foam having an anti-wicking agent which is an aromatic compound having as ring substituents: an —NH$_2$ moiety and/or a hydroxyl moiety and also at least two sulfonate moieties. In another embodiment, the gelatin foam is combined with phyllosilicate mineral lamellae for void control and as a shrinkage deterrent. In yet another embodiment, crosslinked gelatin foam is described which has been crosslinked with a melamine/formaldehyde condensation product, a polyfunctional aziridine and/or an epichlorohydrin/polyamide condensation product.

20 Claims, 2 Drawing Sheets

Fig. 3

THERMAL FOAM INSULATION

BACKGROUND OF THE INVENTION

FIELD OF THE INVENTION

Gelatin-based thermal insulation is described. The thermal insulation is obtained utilizing foamed compositions containing ingredients which provide advantageous properties to the gelatin-foam.

Thermal insulation continues to be an important field for development. Although developments in insulation have been made, there are still a number of drawbacks to traditional insulation materials. Many inorganic materials are friable, have health hazards, and tend to be high in density. With the organic insulation, combustibility, toxicity, smoke, and environmental hazards continue to be a concern where the insulation is used.

Gelatin foam has been suggested as an appropriate insulation in U.S. Pat. No 4,331,547. As an insulation, however, the foam has disadvantages which are inherent in the gelatin foam itself. Specifically, gelatin foam is plagued with shrinkage, both as it dries and under humid or moist conditions.

Insulation shrinkage is, therefore, a problem for gelatin-based insulation, particularly when the foam is cast into a shape such as a cylinder. Such shrinkage results in severely distorted shapes which must be machined or ground, resulting in high scrap levels.

When gelatin foam contacts water it characteristically pulls water into the dry areas of the foam, a process known as "wicking". This severely limits the utility of the gelatin foam insulation since some applications require insulation which is resistant to wicking water.

It would be desirable and advantageous to provide a gelatin foam insulation that is resistant to both wicking and shrinkage on drying. At the same time this insulation should maintain good to excellent standards in the other characteristics needed for good insulation. Thus, the insulation should be non-toxic, and it should be fire resistant and emit little smoke during combustion and, of course, it should possess reasonable thermal conductivity.

The present invention has provided such insulation. Specifically, thermally insulative compositions described herein contain an ingredient that makes the foam resistant to wicking. In addition to this, other embodiments provide foam that is resistant to shrinkage during drying. Still another embodiment provides a foam insulation which is resistant to shrinking when it is wet. This insulation, in fact, is spongy when it is wet and has shape memory. At the same time, the gelatin foam has fire resistance, low smoke, environmental safety, and an appropriate thermal conductivity.

SUMMARY OF THE INVENTION

Thermal insulation comprises a gelatin foam which also contains an aromatic compound having as ring substituents: at least one member selected from the group consisting of an —NH$_2$ (amino) moiety and a hydroxyl (—OH) moiety, and at least two moieties selected from the group consisting of an alkaline earth metal sulfonate and an alkali metal sulfonate. The foam contains these aromatic compounds at an amount effective to reduce the ability of the foam composition to wick water.

In another embodiment, the present invention includes thermal insulation which comprises the gelatin foam which also contains phyllosilicate mineral lamellae. The said lamellae are present at a maximum amount of about 700 parts by weight per 100 parts by weight of the dry gelatin. Preferably, the mineral lamellae are present in the range of from about 25 to about 500 PPH (parts by weight per hundred parts by weight) of the dry gelatin.

In further embodiments, the insulation of the present invention also includes at least one crosslinking agent (such as glutaraldehyde) which has crosslinked the gelatin, making the foam more resistant to water and more shrink-resistant under moist conditions. Such crosslinking agents may be added to the gelatin before or after it has been foamed. The crosslinker(s) is added at an amount effective to crosslink the gelatin, giving the foam more shrink resistance in spite of moist conditions and also allowing the wet foam to be dried at elevated temperatures without collapse.

In other embodiments, the present invention offers foam insulation having shape memory when the foam is wet. The wet foam becomes spongy and can literally be squeezed to force the water out of it. After squeezing, the foam will return to its original shape. This thermal insulation comprises the crosslinked gelatin foam which has been crosslinked with a secondary crosslinker selected from the group consisting of a melamine/formaldehyde condensation product, a polyfunctional aziridine, and an epichlorohydrin/polyamide condensation product. The term "secondary" is used here somewhat arbitrarily to designate these crosslinkers which tend to crosslink more slowly than the dialdehyde but which can be used by themselves to obtain an insulation which, when it is wet, becomes spongy, allowing it to be squeezed, and having the tendency to return to its original position. These secondary crosslinkers are most preferably used in combination with the highly desirable dialdehyde crosslinkers. A dialdehyde crosslinker (such as glutaraldehyde) is added when drying at elevated temperatures is desired.

Any of the foam compositions described herein can be made into pipe insulation. For pipe insulation, the foam is made into a tubular shape having a central bore which receives the pipe. Preferably, before it dries, the foam is molded or shaped into pipe covering insulation which can be secured around a pipe to cover it and provide effective insulation for the pipe.

As pipe insulation, the foam forms a hollow structure. It has a tubular shape with a central bore which is hollow and has a size that allows it to snugly embrace the pipe to be covered. Preferably, the foam pipe insulation is in two substantially identical sections which, when put together, joining the mating surfaces, form the hollow structure, shaped to snugly embrace the pipe. Each section has mating surfaces.

To close, and hold the insulation to the pipe, any suitable means can be used. For example, a pipe wrap (cladding) is preferably put around the outside of the foam, holding the mating surfaces together and holding the insulation on the pipe. If desired, adhesive can hold the cladding to the insulation. Another way to install the pipe insulation is using an adhesive coating which can be put on at least one surface that will be brought into contact with the mating surface on the other section of pipe covering. In this embodiment, it is preferred that all mating surfaces of the foam insulation have an adhesive so that the sections will be secured to each other and held together by the cohesion of the adhesives. Even when the adhesive is used, however, pipe cladding can be used to wrap the outside of the pipe.

When adhesive is used, a layer of protective sheet material can be put over the adhesive on the coated surface of the foamed insulation to keep it from sticking until it is ready for installation. The present pipe insulation can also be fitted with the closing system described in U.S. Pat. No. 4,748,060.

The insulation can also be cast into sheet form for use as wall insulation. In this form an optional covering can be adhered to one or both sides. In addition, the foam can be made in the form of small pieces or prills of various sizes. These can be used as blow-in or pour-in insulation in cavities or void spaces in buildings or other structures which require insulation. The prills can also be bound together with an adhesive.

BRIEF DESCRIPTION OF THE DRAWINGS

FIG. 1 is a view of the pipe insulation showing substantially identical sections 1 and 2 of the pipe covering. Each of the sections-has an adhesive coated mating surface 3 and 4 of each section with the protective sheet of release paper 5 in between the mating surfaces to prevent them from sticking to each other. When the sections 1 and 2 are placed together, they form a tubular structure which is a jacket for the pipe. The tubular structure (or jacket) has a bore 6 which has a suitable size to receive a pipe.

FIG. 2 is a cross sectional view through the pipe covering and pipe 7 which it covers. Mating sections 1 and 2 are shown along with the mating surfaces 3 and 4 of these sections, and the bore 6 and pipe 7.

DETAILED DESCRIPTION

Figures 1, 2:
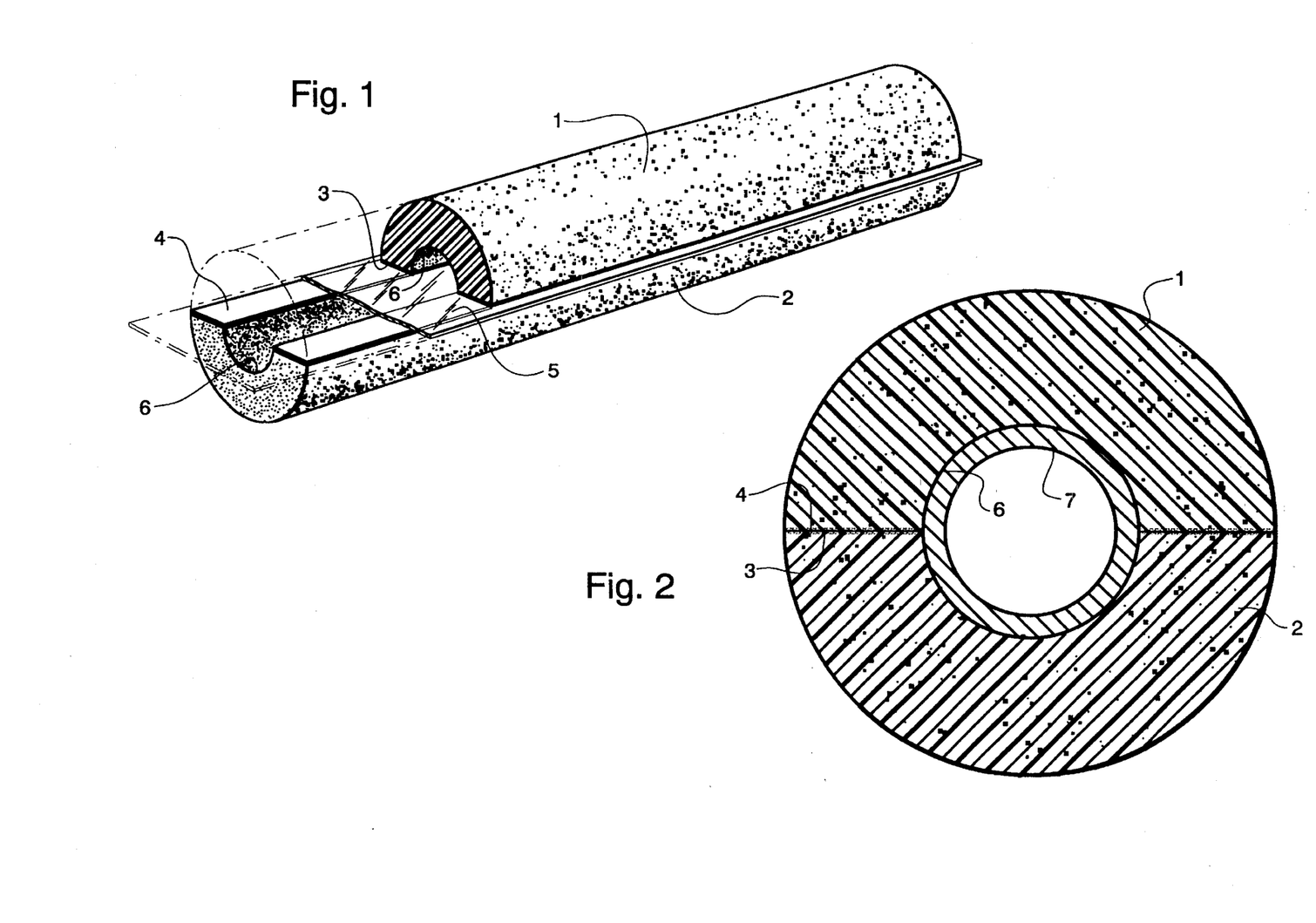
Figure 3:
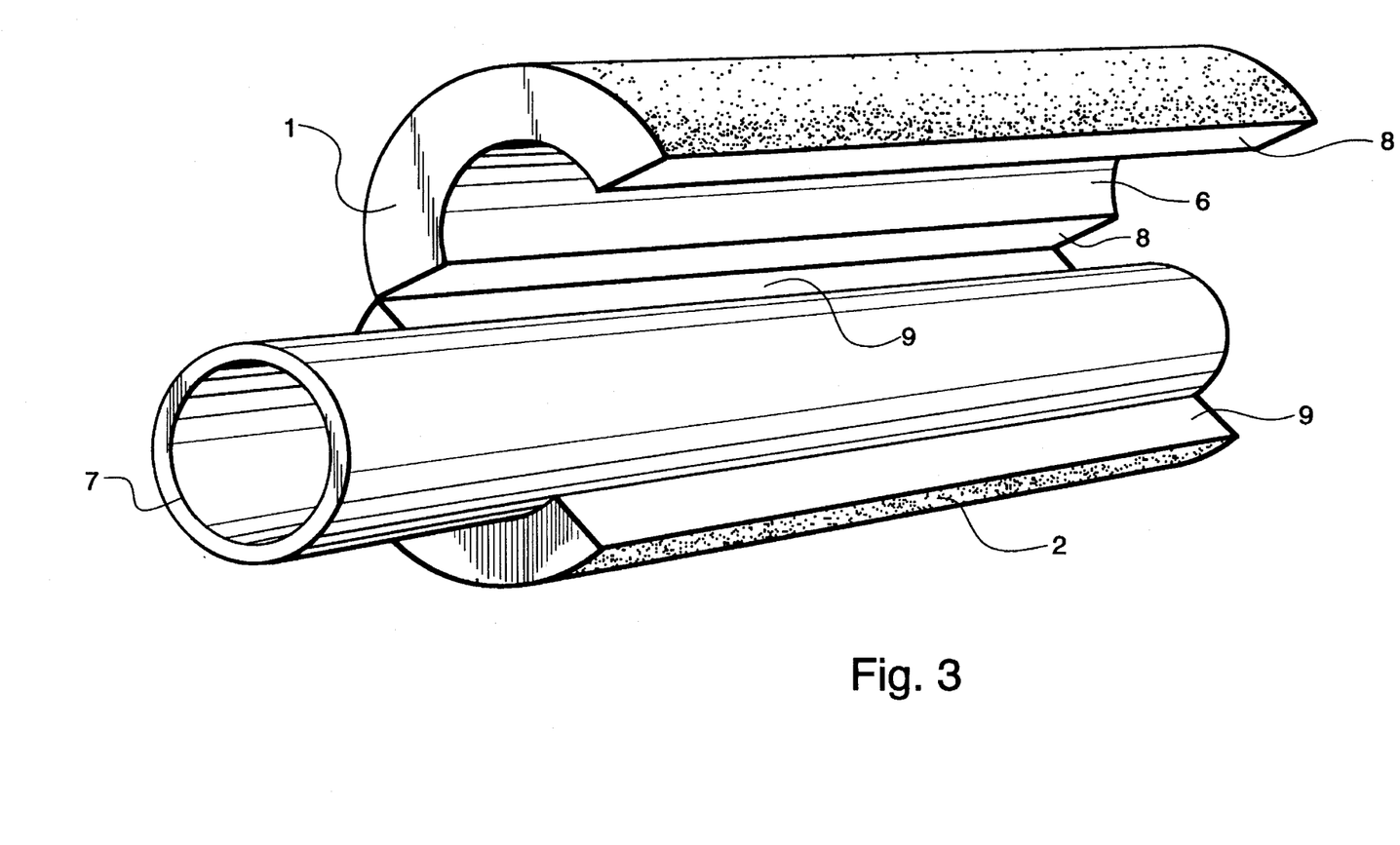
FIG. 3 is a view of the pipe insulation covering (jacket) which is in an open position with a pipe 7 in one section and the exposed, substantially identical mating surfaces 8 and 9. The two sections can be placed together and secured by suitable means for holding the sections in place (such as ties or pipe cladding). Alternatively, as in FIG. 1, a pressure sensitive adhesive can be used so that the two identical, mating sections 1 and 2 can be put together so that the mating surfaces touch and stick to each other, snugly fitting around the pipe.

To prepare the insulation of the present invention, an aqueous gelatin solution is prepared. The solution should be at least about 2% by weight gelatin in order to have a stable, permanent foam. The maximum limit to the amount of gelatin in the solution will be that amount which can be put into a solution with water. Suitably, the aqueous gelatin solution can have gelatin at an amount in the range of from about 2 to about 15% by wt. Preferably, the amount of gelatin is in the range of from about 5 to about 13% by wt. In the embodiments of the present invention, the gelatin can be present in the dry product at an amount of from about 2% to about 99% by weight.

The ingredients for the insulation can be combined in any convenient order or manner. If dry gelatin is used, it should be stirred in the water until the combination has become clear, forming an aqueous gelatin solution. Preferably the dry gelatin is added to water which preferably is at a temperature in the range of from about 20° to about 60° C. The gelatin-water combination is then mixed until a clear solution is obtained. Thereafter, the crosslinking agent, an anti-wicking agent, and/or the mineral platelets can be added with or without any other optional ingredients (filler, surfactant, additional crosslinker, biocide, etc.) followed by foaming. Optionally, the crosslinker can also be added after the foam is formed.

Preferably, either the anti-wicking agent or the phyllosilicate (platelet-shaped mineral) mineral lamellae, or both, are added to the aqueous gelatin solution (along with any other optional ingredients). Suitably, however, these ingredients can be combined in any order. For example, the water can be combined with the lamellae and/or the anti-wicking agent followed by the addition of the gelatin. Alternatively, such ingredients can even be added after foaming.

After the ingredients are combined together, the aqueous gelatin is foamed. Any means to obtain foam can be used. The foam can, for example, be made by agitation. Preferably, however, the foam is prepared using the injection of a gas into the aqueous gelatin mixture. Any gas or mixture of gases could be used to prepare the foam. Preferably, however, the gas is nitrogen or air. Any foaming equipment can be used to inject the gas into the aqueous gelatin and make the wet foam.

For foaming, the aqueous gelatin mixture should be maintained at a suitable temperature. A temperature is used which will be effective to allow foaming to occur. Preferably, the temperature used during foaming will be in the range of from about 30° to about 55° C.

After the wet foam has been made, it is preferred that the dialdehyde crosslinker (such as glutaraldehyde) is injected into it to crosslink the gelatin. Suitably, however, the crosslinker could also have been added to the water or aqueous gelatin before foaming. Adding the rapidly working crosslinkers after foaming avoids the possibility of the gelatin crosslinking inside the foaming equipment.

While the foam is still wet, and before it becomes stiff due to the crosslinking and gelation, the foam can either be sheeted out or molded. In preferred embodiments, a crosslinker is mixed into the wet foam as it is injected into a mold which has a configuration that will give the foam insulation a specific shape. Crosslinkers that work rapidly to crosslink the gelatin (such as the dialdehyde crosslinkers) are preferably added after foaming. If desired, the mold can be coated with a mold-release agent to help obtain a molded foam with a smooth, non-blemished surface.

Alternatively, as it is made, the foam can be put directly into the place to be insulated. In such a case, the crosslinker can be added to the foam after or before it is made or even before or as it goes into place. After it is sheeted out, molded, or put into place, the wet foam is then dried to obtain the insulation.

Drying can be done either at ambient conditions or it can be done with heat using such optional features as a microwave oven or a hot air oven. The wet foam can be dried at any suitable temperature which is low enough to allow the foam to dry without melting the foamed gelatin. The crosslinked foam can be dried at higher temperatures, thus, when the fast working dialdehyde crosslinkers (such as glutaraldehyde) are used, the foam can be dried at temperatures up to about 80° C.

Suitably, the foam can be dried at a temperature in the range of from about 10° to about 80° C. However, when there is no dialdehyde crosslinker present, the foam preferably is dried at a temperature in the range of from about 10° to about 30° C. until the foam is sufficiently dry to allow the foam to be heated without melting the gelatin. After the wet foam has dried for a length of time effective to obtain a foam which can be heated without melting, then the foam can be heated to a temperature of about 150° C. to help the slower working crosslinkers to crosslink the foam faster.

When the crosslinker acts slowly at room temperature, it is preferred to heat the foam to accelerate the crosslinking reaction before the foam is used. Drying at elevated temperatures will accelerate the crosslinking reaction of certain crosslinkers such as, for example, polyfunctional aziridine, and the condensation products of melamine/formaldehyde and epichlorohydrin/polyamide. In preferred embodiments, where both the dialdehyde crosslinker and a slower working ("secondary") crosslinker are present, preferably, the foam is partially dried at a temperature in the range of from about 20° to about 80° C. for a length of time effective to crosslink the foam with the dialdehyde crosslinker, and then the foam is heated at a temperature up to about 150° C. for a length of time effective to finish drying and crosslinking with the other crosslinker.

Broadly, the amount of water used in the aqueous gelatin mixture can range from about 95 to about 35% by total processing weight. Preferably, the water is present at an amount of from about 40 to about 75% by total processing weight (the weight of all ingredients in the process including the water). Most preferably the amount of water used in this process is from about 45 to about 65% by wt. Although the water could be present at up to about 95% by processing weight, it is preferably minimized in order to strengthen the wet gel, minimize drying time, and provide for better mold release.

The anti-wicking agent used with the present invention gives the foam insulation protection against the movement of water to non-immersed areas of the foam. The anti-wicking agent can be present in the dry product at an amount of from about 0.001 to about 10 PPH of the dry gelatin. With these anti-wicking agents, the foam has more utility in wet or humid conditions. With the anti-wicking agent, the foam has a decreased tendency to take in water.

In general the anti-wicking agent can be selected from any aromatic compound which has the following ring substituents: 1) at least two sulfonate moieties which are selected from the group consisting of an alkali metal sulfonate and an alkaline earth metal sulfonate; and 2) at least one moiety selected from the group consisting of an —$NH_2$ moiety and a hydroxyl moiety. This includes compounds with one or more aromatic rings having two (or more) alkali and/or alkaline earth metal sulfonates further having at least one amino and/or at least one hydroxyl moiety as a ring substituent someplace on the aromatic ring of the molecule.

Many of the more preferred anti-wicking agents also find utility as direct or acid dyes.

Some of the preferred anti-wicking agents have the following structural formulas:

where b can be any whole number from 2–5 and each M can independently be either an alkali or alkaline earth metal; where t can be a whole number from 1–4 and R is either a hydroxyl or an amino moiety, and if t is 2 or more, each R can independently be either a hydroxyl or an —$NH_2$ moiety;

where either b or c can be a whole number from 0 to 4, but when b and c are added together the total must be 2–7 and each M can independently be either an alkali or alkaline earth metal; where t or u can be 0–4 but when t and u are added together the total must be from 1 to 6 and each R can independently be either a hydroxyl or an —$NH_2$ moiety;

where b and d can be a whole number from 0 to 4 and c can be from 0 to 2, except that b, c, and d will add together to be from 2–9 and each M can independently be either an alkali or alkaline earth metal; where t and v can be from a whole number from 0 to 4 and u can be from 0 to 2 except that t, u, and v will add together to be from 1–8 and each R can independently be either a hydroxyl or an —$NH_2$ moiety;

where b, d, e, and g can be from 0 to 4 and c and f can be from 0 to 3 except that b, c, d, e, f, and add together to be from 2–21 and each M can independently be either an alkali or alkaline earth metal; where t, v, w, and can be from 0 to 4 and u and x can be from 0 to 3 but when t, u, v, w, x, and y are added together, the total can be from 1 to 20 and each R can independently be either a hydroxyl or an —$NH_2$ moiety;

where b and e can be from 0 to 5 and where c and d can be from 0 to 3 except that b, c, d, and e add together to be from 2–15 and each M can independently be either an alkali or alkaline earth metal; where t and w can be from 0 to 5 and where u and v can be from 0 to 3 except that t, u, v, and w add together to be a whole number from 1 to 14 and each R can independently be either a hydroxyl or an —NH$_2$ moiety;

where b and g can be from 0 to 4, c and f can be from 0 to 2, and d and e can be from 0 to 3 where b, c, d, e, f, and g add together to be from 2–17 and each M can independently be either an alkali or alkaline earth metal; where t and y can be from 0 to 4, u and x can be from 0 to 2, and v and w can be from 0 to 3 where t, u, v, w, x, and y add together to be from 1–16 and each R can independently be either a hydroxyl or an —NH$_2$ moiety.

Additional substituents which could permissively be on any of the aromatic rings in the formulas under 1)–6) above (instead of the hydrogen) include —NO$_2$, =O, oxyalkyl, an alkyl, or an aryl moiety. The alkyl can be saturated or unsaturated, branched, cyclic or straight chain and can have up to 50 carbon atoms; the aryl can be a phenyl, naphthyl, anthracenyl, or diphenyl. In the preferred embodiments, however, the only other substituent is hydrogen.

In another embodiment the foam insulation contains phyllosilicate mineral lamellae. "Phyllosilicate" minerals refers to those which naturally have the plate-like shaped particle (known also as lamellae or platelets). The lamellae can be provided by any of the phyllosilicate minerals (such as, for example, kaolinite, talc, biotite, mica, vermiculite, etc.). Preferably the mineral lamellae are selected from the group consisting of mica and vermiculite.

The mineral lamellae act to decrease shrinkage during drying, help in mold release, help to prevent voids which can sometimes form in drying, and also help maintain a more uniform cell structure. If the insulation is to be put into place while it is still wet, it is preferred that the insulation contains the phyllosilicate mineral lamellae in order to decrease or eliminate foam shrinkage during drying.

Acceptably, the phyllosilicate mineral lamellae are used in the insulation at an amount in the range of from about 25 to about 700 PPH (parts by weight per hundred parts by weight) of the dry gelatin. Preferably, the insulation contains the phyllosilicate lamellae at an amount in the range of from about 25 to about 500 PPH of the dry gelatin. While there is no maximum or minimum size limitation to the mineral platelet, the lamellae suitably can have average platelet diameters (distance across) of about 2.5 millimeters (mm) or less. Preferred lamellae are in the range of from about 50 Å(angstroms) to about 1 mm in diameter.

The embodiments of the present invention include foams having a filler which can be used with or without the phyllosilicate lamellae. The filler can be selected to obtain or enhance characteristics, such as toughness, reduced smoke generation, reduced cost, controlled cell size, impart increased bacterial and/or fungal resistance and increase resistance to attack by insects and rodents. Examples of such fillers include, limestone, calcium hydrogen phosphate, calcium phosphate, zinc borate, calcium borate, clay, perlite, wollastonite, and alumina trihydrate. The filler can be included at an amount up to about 700 PPH of the dry gelatin, suitably in the range of from about 50 to about 700 PPH of the dry gelatin, and preferably in the range of from about 100 to about 600 PPH. If the phyllosilicate mineral lamellae are also present in the same embodiment, the total amount of the filler and the lamellae combined should be a maximum of about 800 PPH.

Additional ingredients which can also be included are, for example, one or more of the following: humectant, fiber, a pesticide, a fungicide, latex, a binder, another gelatin crosslinker, a surfactant, a pigment, and an infrared opacifier. In preferred embodiments, the insulation could include one or more of such additives to improve or modify the foam insulation. Additives can be used to improve characteristics such as tensile strength, modify density, decrease friability, and optimize thermal conductivity.

In the most preferred embodiments, the insulation includes an anionic surfactant, an additional crosslinker, and a humectant. Such ingredients can suitably be added either before or after foaming. The dry ingredients are preferably combined before foaming.

Any dry ingredients must be wetted out in order to form a well mixed, uniform blend for the product. If there is a sufficiently large amount of dry ingredients or additional crosslinker present, then an effective amount of an anionic surfactant or the anionic surfactant and water can be used to help in foaming. The use of an anionic surfactant is optional but can be employed when practicing this art to provide increased tendency to produce a foam or to insure a complete wetting of the filler.

The gelatin, a degradation product of collagen, has different molecular weights, depending on the degree of degradation. The various gelatins, have different jelly strengths. These jelly strengths can be expressed in Bloom grades. A gelatin is rated with a jelly strength of 1 Bloom grade level if a weight of 1 gram on a ½ inch diameter tup causes the tup to penetrate the gelatin to a depth of 4 millimeters (mm). Commercially available gelatin has strengths from 30 to 300.

The gelatin utilized with the present invention can be commercially obtained or could even be prepared by boiling the animal parts in water. Either acid (type A) or base (type B) gelatin can be used. In addition to this, gelatins having different Bloom grades can be mixed together to obtain a gelatin having a different Bloom grade. The Bloom can be in the range of from 60 to 300 but preferably the gelatin used for the present invention has a minimum Bloom of at least about 60. Most preferably, the gelatin has a Bloom grade in the range of from about 150 to about 275.

With the presence of gelatin preferred additives include fungicides and pesticides. A fungicide or a pesticide can be included at an amount in the range of from about 0.01 to about 5 PPH of gelatin. Suitable fungicides include borates, benzoate salts, propionate salts, or substituted adamantanes. Suitable pesticides include borates, carbamates and phosphonates.

A crosslinker for the gelatin is included to crosslink the proteinaceous gelatin foam, making it more durable, moisture resistant, and also improving the drying properties. The crosslinker which is preferably used with the present invention is a dialdehyde; most preferably it is glutaraldehyde. Other crosslinkers which can also be used are glyoxal and formaldehyde.

Specific embodiments of the present invention provide a "spongy-when-wet" foam insulation. These embodiments utilize a dialdehyde crosslinker (preferably glutaraldehyde) and a secondary crosslinker selected from the group consisting of aziridine, a melamine/formaldehyde condensation product, and a polyamide/epichlorhydrin condensation product. Each "condensation product" is a crosslinker which is the product of the condensation reaction (one between epichlorhydrin and polyamide and the other between melamine and formaldehyde).

Where the "spongy when wet" foam insulation is to be made, the secondary crosslinker (which is selected from the group previously specified) can be present at an amount of from about 2 to about 15 PPH by weight of the dry gelatin. In preferred embodiments, the dialdehyde crosslinker is used at an amount in the range of from about 0.1 to about 15 PPH of the dry gelatin.

In other embodiments, a crosslinker can acceptably be used at an amount in the range of from about 0.1 to about 30 PPH of the dry gelatin. A preferred crosslinker concentration is from about 0.1 to about 20 PPH of the dry gelatin. Most preferably it is present at an amount in the range of from about 0.1 to about 15 PPH of the dry gelatin.

Significantly, an optional latex polymer can be included in the present invention. The latex acts as a mold release agent and advantageously acts to reduce surface blemishes (such as cracks and depressions) and helps to produce a smooth surface in the finished foam. An increase in thermal conductivity can come from a poor surface. Having a good surface in the molded foam product is, thus, a considerable advantage since it also reduces or even avoids the need for surface finishing steps done to the foam product.

Although any latex polymer could be combined, it is the goal of the present invention to reduce smoke corrosivity problems in the insulation. Hence, a suitable latex does not contain halogen and can be either a synthetic or natural polymer. Suitably the latex could be an acrylic, styrene-butadiene rubber (SBR), acrylonitrile-styrene-butadiene rubber (ABR), nitrile rubber, polyvinyl acetate, or natural rubber. Preferably, the latex can be selected from the group consisting of acrylic and SBR.

Suitably, the amount of latex has the latex solids present at an amount up to about 100 PPH of the dry gelatin. Preferably, the latex polymer is present at an amount which places the latex solids at a level in the range of from about 0.01 to about 50 PPH of the dry gelatin.

The foam insulation described and provided herein can provide a thermal conductivity less than 0.05 W/m°K. (watt/meter°Kelvin). In preferred embodiments a conductivity of less than 0.047 has been measured.

The density of the foam insulation can be controlled, to some degree, using variables such as filler addition and the volume of air which is put into the foam. Hence, the foam density can vary between about 24 to about 164 Kg/m$^3$. A preferred density is in the range of from about 40 to about 115 Kg/m$^3$ (kilograms per cubic meter).

The present invention is illustrated by the examples which follow. All parts and percentages are by weight unless otherwise indicated.

EXAMPLE 1

Foam insulation was prepared using several different anti-wicking agents. To provide a contrast as a comparison a control sample was prepared which had the same formulation as samples A–E but did not have the anti-wicking agent. The control formulation was:

200 g water 6 g 275 Bloom Type A gelatin 6 g 150 Bloom Type A gelatin 18 g zinc borate (ZB 223, Climax Corp)

2 g 5% aqueous glutaraldehyde

The samples under 2–6 (A–K) below contained the anti-wicking agents in the amounts indicated. The test results are given for each sample. All of the samples were prepared by the following method:

The ingredients used for the sample were whipped in a Hobart mixer for one minute until a fine celled foam resulted. This was spread out approximately one inch thick on a Teflon release paper to dry. Once dried, the foam was sectioned and floated in a pan of water for seven days. At the end of this time, the height of wet foam was measured and taken as representative of the wicking behavior of the dried foam.

1) Control (having no anti-wicking agent): the height of wet foam was 0.40 inches.

2) Samples A–D had the anti-wicking agent: 6,6'-[(3,3'-dimethoxy[1,1'-biphenyl]-4,4'-diyl)bis(azo)]bis[4-amino-5-hydroxy-]-1,3-naphthalenedisulfonic acid tetra sodium salt.

| Sample | Amount of Anti-Wicking Agent (in grams) | Height of the Wet Foam (in inches) |
| --- | --- | --- |
| A | .075 | .30 |
| B | .15 | .20 |
| C | .225 | .10 |
| D | .30 | .10 |

3) Samples E–H had the anti-wicking agent: 2,2'-[(9,10-dihydro-9,10-dioxo-1,4-anthracenediyl)diimino]bis[5-butylbenzenesulfonic acid], disodium salt.

| Sample | Amount of Anti-Wicking Agent (in grams) | Height of the Wet Foam (in inches) |
| --- | --- | --- |
| E | .075 | .35 |
| F | .15 | .25 |
| G | .225 | .25 |
| H | .30 | .25 |

4) Sample I had the anti-wicking agent: 4-amino-5-hydroxy-3-[(3-nitrophenyl)azo]-6-(phenylazo)-2,7-naphthalene disulfonic acid, disodium salt.

| Sample | Amount of Anti-Wicking Agent (in grams) | Height of the Wet Foam (in inches) |
|---|---|---|
| I | .75 | .20 |

5) Sample J had the anti-wicking agent: 2,2'-(1,2-ethenediyl)bis[5-(4-hydroxyphenyl)azo]benzenesulfonic acid, disodium salt.

| Sample | Amount of Anti-Wicking Agent (in grams) | Height of the Wet Foam (in inches) |
|---|---|---|
| J | .30 | .06 |

6) Sample K had the anti-wicking agent: 3-amino-1,5-naphthalene-disulfonic acid disodium salt.

| Sample | Amount of Anti-Wicking Agent (in grams) | Height of the Wet Foam (in inches) |
|---|---|---|
| K | .30 | .20 |

The above data clearly illustrates the effectiveness of the use of such materials in limiting the wicking behavior of these foams. This shows that these anti-wicking agents can be used in the gelatin foam to produce a foam that can be used under humid and even moist conditions.

EXAMPLE 2

Insulation was made and the thermal conductivity tested using the following formulation:
650 ml water
16 grams Type A gelatin 275 Bloom
48 grams Type A gelatin 150 Bloom
32 grams Zinc borate (ZB 223, Climax Corporation) (for smoke and insect control)
32 grams calcium hydrogen phosphate (for cell size)
210 grams 325 mesh limestone (calcium carbonate) (as a filler)
110 grams 60 mesh phlogopite mica (Suzerite 60S, from Suzerite Corp.) (the mica was added for anti-shrinkage in the drying step and for pore and void control)
0.5 grams of 6,6'-[(3,3'-dimethoxy[1,1'-biphenyl]-4,4'-diyl)bis(azo)]bis[4-amino-5-hydroxy-]-1,3-naphthalenedisulfonic acid tetra sodium salt (as an anti-wicking agent)
0.5 grams 2,2'-(1,2-ethenediyl)bis[5-(4-hydroxyphenyl)azo]benzenesulfonic acid, disodium salt (as an anti-wicking agent)
3 grams sorbitol as a humectant
1 gram of anionic surfactant (Aerosol OT from American Cyanamid Inc.) (75% solids in an aqueous solution)
50 grams of polyamide/epichlorohydrin condensation product (Polycup 172 from Hercules Inc.) (12.5% solids) as a crosslinker The gelatin and sorbitol were dissolved in the water at 55° C. along with the Polycup 172 crosslinker. The two anti-wicking agents were added along with the Aerosol OT and allowed to dissolve. The zinc borate, limestone, calcium hydrogen phosphate and phlogopite mica were added and dispersed by stirring. The solution was cooled to 35° C. for foaming. It was then added to the tank of a Goodway Model CM-10 Foamer and the solution was pumped into the foaming head at a rate of 300 ml per minute. Air was fed into the foaming head at a rate of 800 ml per minute at a pressure of 80 psi. The foaming head was operated at a speed sufficient to produce a fine celled foam but without the incorporation of large air bubbles. Then, as the foam was pumped from the head through a tube, about one meter from the end of the tube a 1.5% by weight glutaraldehyde solution (for crosslinking) was injected under pressure at the rate of 20 ml per minute. The foam/glutaraldehyde mixture was passed over a continuous mixer segment imbedded in the remaining tube and pumped into a cylindrical or rectangular mold coated with a thin layer of petrolatum. After a period of five to ten minutes, the mold was removed and the stiffened, crosslinked gel was allowed to dry at room temperature.

When drying was completed, a foam which had a density varying from 5 to 7 pounds per cubic foot was obtained. During the drying process, little shrinkage had occurred and there was little, if any, distortion of the surface.

The foam was then heated at 100° C. for 24 hours to insure a complete reaction of the crosslinker.

The foam produced did not shrink when immersed in water for one week.

A sample of this material was also tested for thermal conductivity by the method of ASTM C-518 and gave the following results:
0.0444 W/m°K. at 70° F.
0.0465 W/m°K. at 104° F.

EXAMPLE 3

This example demonstrates the low smoke emissions of the gelatin foam of the present invention. Foams were made with the two formulations indicated below. The samples were then dried, cut to size and subjected to the testing conditions described in ASTM E-662, commonly known as the NBS Smoke Chamber. The results of the tests are indicated below each formulation.
Sample A formulation:
800 ml water
16 grams 275 Bloom Type A gelatin
48 grams 150 Bloom Type A gelatin
64 grams zinc borate
192 grams 325 mesh limestone filler
3 grams sorbitol as a humectant
0.5 grams 6,6'-[(3,3'-dimethoxy[1,1'-biphenyl]-4,4'-diyl)bis(azo)bis[4-amino-5-hydroxy-]-1,3-naphthalenedisulfonic acid tetra sodium salt (as an anti-wicking agent)
0.5 grams 2,2'-(1,2-ethenediyl)bis[5-(4-hydroxyphenyl)azo] benzenesulfonic acid, disodium salt (as an anti-wicking agent)
20 ml 1.67% aqueous glutaraldehyde solution (as a crosslinker)
Sample A test results (E-662) (½" thick):
Dm Flaming 21
Dm Non-Flaming 17
Sample B formulation:
800 ml water
16 grams 275 Bloom Type A gelatin
48 grams 150 Bloom Type A gelatin 64 grams zinc borate 192 grams calcium hydrogen phosphate dihydrate (for cell size)

3 grams sorbitol 0.5 grams 6,6'-[(3,3'-dimethoxy[1,1'-biphenyl]-4,4'-diyl)bis(azo)]bis[4-amino-5-hydroxy-]-1,3-naphthalene-disulfonic acid tetra sodium salt (as an anti-wicking agent)

0.5 grams 2,2'-(1,2-ethenediyl)bis[5-(4-hydroxyphenyl)azo]benzenesulfonic acid, disodium salt (as an anti-wicking agent)

20 ml 1.67% aqueous glutaraldehyde (as a crosslinker)

Sample B test results (E-662) (½ inches thick):

Dm Flaming 31

Dm Non-Flaming 16

EXAMPLE 4

This example shows the use of latex as a mold release agent and also demonstrates the drying properties of the molded foam. The two formulations given below were produced as described for Example 2 using a Goodway foaming machine. The foam was then injected into cylindrical molds three inches in diameter and approximately two feet high. The molds were previously cut in half along the longitudinal axis and lightly coated inside with petrolatum. In the middle of the molds were placed aluminum mandrels with a diameter of 0.82 inches. The mandrels were covered with a layer of paper to facilitate release of the foam from the mandrel. When the molds were opened, the samples were suitable pipe insulation.

Sample A formulation:

800 ml water 48 grams 150 Bloom Type A gelatin 16 grams 275 Bloom Type A gelatin 64 grams zinc borate 384 grams calcium hydrogen phosphate, fine 3 grams sorbitol 0.5 grams 6,6'-[(3,3'-dimethoxy[1,1'-biphenyl]-4,4'-diyl)bis(azo)]bis[4-amino-5-hydroxy-]-1,3-naphthalene-disulfonic acid tetra sodium salt (as an anti-wicking agent)

0.5 grams 2,2'-(1,2-ethenediyl)bis[5-(4-hydroxyphenyl)azo]benzenesulfonic acid, disodium salt (as an anti-wicking agent)

11 mls 1.67% aqueous glutaraldehyde solution

Sample B formulation:

800 ml water 48 grams 150 Bloom Type A gelatin 16 grams 275 Bloom Type A gelatin 64 grams zinc borate 384 grams calcium hydrogen phosphate, fine 3 grams sorbitol 0.5 grams 6,6'-[(3,3'-dimethoxy[1,1'-6biphenyl]-4,4'-diyl)bis(azo)]bis[4-amino-5-hydroxy-]-1,3-naphthalene-disulfonic acid tetra sodium salt (as an anti-wicking agent)

0.5 grams 2,2'-(1,2-ethenediyl)bis[5-(4-hydroxyphenyl)azo]benzenesulfonic acid, disodium salt (as an anti-wicking agent) 40 mls Hycar 2671 acrylic latex (B. F. Goodrich Corp.)

11 mls 1.67% aqueous glutaraldehyde solution

Sample A had difficulty in releasing from the mold. The surface was rough in places and there was tearing of the wet foam when the molded halves were separated. On drying (at room temperature) the foam developed surface indentations and depressions.

Sample B released easily from the mold and showed a smooth, glossy surface. Upon drying at ambient conditions, an excellent surface was maintained. The sample remained cylindrical with only minor surface imperfections.

EXAMPLE 5

The following formulation was made and foamed on the Goodway foamer and was injected into a cylindrical mold as described in Example 2.

650 ml water 48 grams Type A 150 Bloom gelatin 16 grams Type A 275 Bloom gelatin 32 grams zinc borate 96 grams calcium hydrogen phosphate 256 grams limestone 325 mesh 3 grams sorbitol 0.5 grams 6,6'-[(3,3'-dimethoxy[1,1'-biphenyl]-4,4'-diyl)bis(azo)]bis[4-amino-5-hydroxy-]-1,3-naphthalene-disulfonic acid tetra sodium salt (as an anti-wicking agent)

0.5 grams 2,2'-(1,2-ethenediyl)bis[5-(4-hydroxyphenyl)azo]benzenesulfonic acid, disodium salt (as an anti-wicking agent)

128 mls Hycar 2671 acrylic latex (B. F. Goodrich Corp.)

20 mls aqueous 1.67% glutaraldehyde solution (as a crosslinker)

The formulation foamed well but there was difficulty in getting the sample from the mold. The sample's surface had tears and surface blemishes. In addition to this, voids were found inside the dry foam.

The sample was tested in the ASTM E-662 smoke density test and the following data was obtained:

flaming 116 non-flaming 131

Based on the quality of the foam and the higher E-662 numbers, the upper limit of latex is 100 PPH (parts per hundred parts of dry gelatin).

EXAMPLE 6

Although insulative foams can be prepared without crosslinkers, a foam which has not been crosslinked will shrink under moist conditions. This example illustrates the function of crosslinking the insulative foam of the present invention. The formulation of Sample A contained crosslinkers based on the condensation reaction of polyamides with epichlorohydrin (Polycup 172 from Hercules Inc.) at an amount of 9.8% solids based on the dry weight of gelatin.

Sample A formulation:

650 ml water 16 grams Type A gelatin 275 Bloom 48 grams Type A gelatin 150 Bloom 32 grams Zinc borate 32 grams calcium hydrogen phosphate 210 grams 325 mesh limestone (calcium carbonate)

110 grams 60 mesh phlogopite mica (Suzerite Corporation)

0.5 grams 6,6'-[(3,3'-dimethoxy[1,1'-biphenyl]-4,4'-diyl)bis(azo)]bis[4-amino-5-hydroxy-]-1,3-naphthalenedisulfonic acid tetra sodium salt (as an anti-wicking agent)

0.5 grams 2,2'-(1,2-ethenediyl)bis[5-(4-hydroxyphenyl)azo]benzenesulfonic acid, disodium salt (as an anti-wicking agent)

3 grams sorbitol as a humectant 1 gram surfactant (Aerosol OT from American cyanamid) (75% solids in an aqueous solution)

50 grams polyamide/epichlorhydrin (condensation product as a crosslinker) (Polycup 172 from Hercules) (12.5% solids)

20 ml. (milliliters) of glutaraldehyde 1.6% by wt. in an aqueous solution.

Sample B was prepared with the same formulation, but without the polyamide/epichlorhydrin crosslinker.

The samples were foamed in a Goodway Model CM-10 foamer, molded and dried to give a dry cylindrical pipe insulation foam which was 7 inches long and had an outside diameter of about 1½ inches and an inside diameter of about ⅞ inch with a density of about 7 pounds per cubic foot. Sample A was heated at 100° C. for 24 hours to activate the crosslinker.

Each foam was suspended in a container of water so that the lower one inch of the foam was immersed and was permitted to remain there for seven days.

At the end of this time, for Sample A (which had the secondary polyamide/epichlorhydrin crosslinker in the foam) no shrinkage of the foam in either length or diameter was observed. Furthermore, when the foam was redried, less shrinkage occurred than in sample B. The present invention, thus, has provided an insulation foam that can retain its shape and size even if wetted after installation.

Sample B, however, without a crosslinker, had experienced severe shrinkage at the end of the seven days in water. The 7 inch cylindrical pipe insulation section shrank ⅜ inch in length while the inside diameter collapsed almost entirely. On redrying, the material shriveled and distorted and was unfit for use as pipe insulation.

EXAMPLE 7

In this example, another embodiment of the present insulation is illustrated. The ability of a platelet shaped filler to reduce the shrinkage experienced during drying is demonstrated by contrast.

The insulation of Sample A was prepared with a formulation having, as a filler, chunks of 325 mesh limestone at an amount of 320 grams (g). The formulation of Sample B, however, had a reduced amount of the same limestone filler and an identical amount of phlogopite mica lamellae in addition to the limestone.

Sample A formulation:

550 ml water 48 grams 150 Bloom Type A gelatin 16 grams 275 Bloom Type A gelatin 3 grams sorbitol 32 grams zinc borate (325 mesh)

32 grams calcium hydrogen phosphate 320 grams limestone (325 mesh)

0.5 grams 6,6'-[(3,3'-dimethoxy[1,1'-biphenyl]-4,4'-diyl)bis(azo)]bis[4-amino-5-hydroxy-]-1,3-naphthalenedisulfonic acid tetra sodium salt (as an anti-wicking agent)

0.5 grams of the anti-wicking agent 2,2'-1,2-ethenediyl)bis[ 5-(4-hydroxyphenyl)azo]benzenesulfonic acid, disodium salt, 50 mls Hycar 2671 acrylic latex (B. F. Goodrich Corp) (mold release)

20 mls 1.67% glutaraldehyde solution (as a crosslinker)

Sample B was identical to the formulation of Sample A except that Sample B had only 210 grams of the irregularly shaped particles of limestone (325 U.S. Standard mesh) and also included 110 grams of phlogopite mica lamellae (Suzerite from Suzerite Corp.).

Each sample was foamed in a Goodway foamer and injected into a tubular mold. After several minutes, the mold was opened and the crosslinked foam samples were set aside to dry. After several days, drying was complete.

After drying the samples were compared to see if there was any difference in shrinkage. It was noted that the thermal insulation foam Sample A which had only the limestone filler showed considerable shrinkage and distortion. Sample B, however, having 210 grams of the limestone and 110 grams of the 60 mesh mica platelets showed considerably less shrinkage than Sample A.

EXAMPLE 8

This example demonstrates the preparation of a foam using Sample A which was prepared using an aqueous gelatin solution which was at only 2% by weight of the gelatin and Sample B which was only 1% by weight of gelatin.

Sample A had the following formulation:

200 ml water 2 grams 275 Bloom Type A gelatin 2 grams 150 Bloom Type A gelatin 6 grams zinc borate 0.7 ml 5% glutaraldehyde Sample B had the following formulation:

200 ml water 1 grams 275 Bloom Type A gelatin 1 grams 150 Bloom Type A gelatin 3 grams zinc borate 0.35 ml 5% glutaraldehyde

Each sample was foamed using a Hobart mixer and placed on a sheet to dry. For Sample A, the foam gelled and dried in a satisfactory manner to produce a dried foam. This demonstrates that a dried, crosslinked foam of the present invention can be prepared using an aqueous solution which was 2% by weight gelatin.

The results for Sample B, however, were unsatisfactory. During drying, the foam exuded water and collapsed.

What is claimed is:

1. Foam insulation comprising a foamed, dry gelatin at an amount in the range of from about 2 to about 99% by weight, and an anti-wicking agent, said anti-wicking agent being an aromatic compound having at least two moieties selected from the group consisting of an alkali metal sulfonate and an alkaline earth metal sulfonate and also having at least one moiety selected from the group consisting of a hydroxyl and an amine.

2. The insulation of claim 1 wherein the anti-wicking agent includes at least one of the following compounds:

where b can be any whole number from 2–5 and each M can independently be either an alkali or alkaline earth metal; where t can be a whole number from 1–4 and R is either a hydroxyl or an amino moiety, and if t is 2 or more, each R can independently be either a hydroxyl or an —NH$_2$ moiety;

where either b or c can be a whole number from 0 to 4, but when b and c are added together the total must be 2–7 and each M can independently be either an alkali or alkaline earth metal; where t or u can be 0–4 but when t and u are added together the total must be from 1 to 6 and each R can independently be either a hydroxyl or an —NH$_2$ moiety;

where b and d can be a whole number from 0 to 4 and c can be from 0 to 2, when b, c, and d will add together to be from 2–9 and each M can independently be either an alkali or alkaline earth metal; where t and v can be a whole number from 0 to 4 and u can be from 0 to 2 when t, u, and v will add together to be from 1–8 and each R can independently be either a hydroxyl or an —NH$_2$ moiety;

where b, d, e, and g can be from 0 to 4 and c and f can be from 0 to 3 when b, c, d, e, f, and g add together to be from 2–21 and each M can independently be either an alkali or alkaline earth metal; where t, v, w, and y can be from 0 to 4 and u and x can be from 0 to 3 when t, u, v, w, x, and y add together to be from 1 to 20 and each R can independently be either a hydroxyl or an —NH$_2$ moiety;

where b, and e can be from 0 to 5 and where c and d can be from 0 to 3 where b, c, d, and e add together to be from 2–15 and each M can independently be either an alkali or alkaline earth metal; where t and w can be from 0 to 5 and where u and v can be from 0 to 3 where t, u, v, and w add together to be a whole number from 1 to 14 and each R can independently be either a hydroxyl or an —NH$_2$ moiety;

where b and g can be from 0 to 4, c and f can be from 0 to 2, and d and e can be from 0 to 3 where b, c, d, e, f, and g add together to be from 2–17 and each M can independently be either an alkali or alkaline earth metal; where t and y can be from 0 to 4, u and x can be from 0 to 2, and v and w can be from 0 to 3 where t, u, v, w, x, and y add together to be from 1–16 and each R can independently be either a hydroxyl or an —NH$_2$ moiety.

3. The insulation of claim 1 wherein the foam also contains lamellae of a phyllosilicate mineral a maximum amount of about 700 parts by weight per 100 parts by weight of the gelatin.

4. The insulation of claim 1 wherein the gelatin further is crosslinked and the insulation also contains a crosslinking agent which is a dialdehyde crosslinker.

5. The insulation of claim 1 wherein the gelatin further is crosslinked and the insulation also contains a crosslinking agent which is selected from the group consisting of a melamine/formaldehyde condensation product, a polyfunctional aziridine, and an epichlorohydrin/polyamide condensation product.

6. The insulation of claim 1 which further is pipe insulation.

7. The insulation of claim 1 which further contains a member selected from the group consisting of a humectant, fiber, a pesticide, a fungicide, latex, a surfactant, a pigment, and an opacifier.

8. Foam insulation comprising a foamed, dry gelatin at an amount in the range of from about 2 to about 99% by weight and lamellae of a phyllosilicate mineral.

9. The foam insulation of claim 8 wherein the insulation also contains a crosslinking agent and the gelatin is crosslinked.

10. The foam insulation of claim 8 wherein the lamellae are present at a maximum amount of about 700 parts by weight per 100 parts by weight of the gelatin.

11. Foam insulation comprising a foamed, crosslinked, dry gelatin at an amount in the range of from about 2 to about 99% by weight, a dialdehyde crosslinking agent, and a secondary crossliking agent selected from the group consisting of a melamine/formaldehyde condensation product, a polyfunctional aziridine, and an epichlorohydrin/polyamide condensation product.

12. The insulation of claim 11 wherein the secondary crosslinking agent is the epichlorohydrin/polyamide condensation product.

13. The insulation of claim 11 which further is pipe insulation.

14. The insulation of claim 12 which further contains a member selected from the group consisting of a phyllosilicate mineral, a humectant, fiber, a pesticide, a fungicide, latex, a surfactant, a pigment, and an opacifier.

15. A method for the preparation of foam insulation which comprises combining an aqueous gelatin solution having the gelatin present at an amount in the range of from about 2 to about 15% by weight, and A) lamellae of a phyllosilicate mineral, or B) an anti-wicking agent which consists of an aromatic compound having at least two moieties selected from the group consisting of an alkali metal sulfonate and an alkaline earth metal sulfonate and also having at least one member selected from the group consisting of an $-NH_2$ moiety and a hydroxyl moiety, or C) both the lamellae and the anti-wicking agent to form a mixture, followed by foaming the mixture to produce a wet foam, and then drying the wet foam.

16. The method of claim 15 wherein a crosslinking agent is also combined with the aqueous gelatin solution.

17. The method of claim 16 wherein the crosslinking agent is selected from the group consisting of a melamine/formaldehyde condensation product, a polyfunctional aziridine, and an epichlorohydrin/polyamide condensation product.

18. The method of claim 15 wherein, before drying, a dialdehyde crosslinking agent is added to the wet foam.

19. A method for the preparation of foam insulation which comprises combining an aqueous gelatin solution having the gelatin present at an amount in the range from about 2 to about 15% by weight, and a secondary crosslinker selected from the group consisting of a melamine/formaldehyde condensation product, a polyfunctional aziridine, and an epichlorohydrin/polyamide condensation product to form a mixture, foaming the mixture, adding a dialdehyde crosslinking agent and drying the foam at a temperature of from about 10° to about 80° C. for a time effective to crosslink the gelatin with the dialdehyde crosslinker.

20. The method of claim 19 wherein, after the foam was crosslinked with the dialdehyde crosslinker, the foam was heated at a temperature in the range of from about 10° to about 150° C. for a time effective to crosslink the foam with the secondary crosslinker.

* * * * *

UNITED STATES PATENT AND TRADEMARK OFFICE
CERTIFICATE OF CORRECTION

PATENT NO. : 5,457,136
DATED : October 10, 1995
INVENTOR(S) : G. Robert Hartranft et al.

It is certified that error appears in the above-identified patent and that said Letters Patent is hereby corrected as shown below:

Column 6, line 60, the letter "g" should be inserted after the word "and"; line 62, the letter "y" should be inserted after the word "and".

Signed and Sealed this

Twelfth Day of December, 1995

Attest:

BRUCE LEHMAN

Attesting Officer         Commissioner of Patents and Trademarks